United States Patent [19]

Harris

[11] 4,046,431

[45] Sept. 6, 1977

[54] WATER LUBRICATED BEARING ASSEMBLY FOR MINING MACHINE

[75] Inventor: Robert D. Harris, Delmont, Pa.

[73] Assignee: The United States of America as represented by the Secretary of the Interior, Washington, D.C.

[21] Appl. No.: 611,952

[22] Filed: Sept. 10, 1975

[51] Int. Cl.² .............................................. F16C 37/00
[52] U.S. Cl. ........................................ 308/76; 175/17; 175/337
[58] Field of Search ............................ 308/77, 76, 8.2; 299/81; 175/17, 337

[56] References Cited

U.S. PATENT DOCUMENTS

| | | | |
|---|---|---|---|
| 2,037,967 | 4/1936 | Costa | 175/337 |
| 2,050,988 | 8/1936 | Zublin | 175/337 |
| 3,921,735 | 11/1975 | Dysart | 175/337 |

*Primary Examiner*—Richard A. Bertsch
*Attorney, Agent, or Firm*—Thomas Zack; Donald A. Gardiner

[57] ABSTRACT

A bearing assembly for a rotary drilling tool for a continuous mining machine includes inner and outer races having respective annular bearing surfaces and an annular channel formed between the races for water lubrication and cooling of roller bearing members positioned within the channel. A pump supplies pressurized flow through the channel sufficient to lubricate the bearing and to prevent feedback of rock particles. A transfer passageway drains the water from the bearing assembly and feeds it to the tool to cool the cutter teeth and to allay the fine respirable dust which is potential health hazard to the mine workers. The rollers of the bearing each include an annular notch to form a portion of the flow channel. The notches occupy approximately fifteen percent of the cross-sectional area. Elastic ring support for the outer race absorbs a major portion of the drilling stress from the tool. Rotary water seals and wipers beside the bearings form a rotary water-tight joint. The bearing assembly maintains the concentric position of the fixed and rotary elements of the seals and wipers.

10 Claims, 2 Drawing Figures

WATER LUBRICATED BEARING ASSEMBLY FOR MINING MACHINE

The present invention relates to bearings and, more particularly, to a water lubricated bearing assembly for a rotary drilling tool.

BACKGROUND OF THE INVENTION

Conventional continuous mining machines usually employ some system for feeding liquid to the drilling tool for cooling. The liquid, usually water, may be transferred along the shaft of the mining machine to outlets that spray the water against the wall face being mined.

Heretofore, this arrangement has proven to place costly restraints on the manufacture, operation and repair of such a machine. Generally in order to make such a machine serviceable without significant leakage of the water sealing system:(1) higher quality machining and material preparation is required; (2) heavier parts are required to reduce deflection and bearing play; (3) less severe usage is required to minimize distortion; and more (4) more care is required in field servicing because of potential distortion.

A prior suggestion has been made by others to build in a separate bearing system in the seal area to isolate the seals from the action of the machine. In this instance, the water cooling system is separated from the bearing by a water and oil interface seal. An additional seal and associated wiper is provided in the bearing and an additional water seal and associated wiper is provided adjacent the water transfer channel. The oil is fed to the water system bearing by conventional pressurized oil systems.

The drawbacks to this suggested system are also evident. First, the system is costly since two separate liquid feeding circuits are required and seals for both systems are necessary. The risk of contamination of the oil circuit with water from the water circuit is always present, and when it occasionally happens a costly shutdown of the mining machine is required.

SUMMARY OF THE INVENTION

The present invention eliminates the oil circuit altogether and places the bearing member in the channel forming the water transfer system. The bearing members, preferably rollers, are carried by a conventional cage and are supported on inner and outer races having respective annular bearing surfaces within the channel. A pump is provided to supply a pressurized flow of water through the channel sufficient to lubricate the bearing. The water is drained from the bearing assembly and transferred to the drilling face of the tool for cooling. Thus, the bearing lubrication and the tool cooling function are advantageously combined from a single source of water by the apparatus of the present invention.

The bearing members and the associated parts are machined from non-corrosive materials, such as, hardened stainless steel. The bearing assemblies of the present invention could be designed to support the rotary tool in its entirety thus rendering other bearing and associated lubrication and cooling systems unnecessary. However, at present, it is contemplated that additional conventional rotary bearing support be incorporated to take a portion of the potentially destructive motions of the mining head. In either case, the bearing assembly isolates the seal area and serves to provide mutually concentric positioning of the fixed and rotating elements of the seal elements during the operation of the mining machine. The provision for such concentric operation prolongs the life of the seals and optional wipers.

Preferably, a V-shaped cut-out is formed on the rollers to provide a channel of increased cross-sectional area. The notch of approximately fifteen percent of the cross-sectional area of the roller should assure an adequate flow of lubrication and at the same time provide adequate cooling to the tool. The supply means for the water maintains a positive stream flow to prevent feedback of drilling particles from the working area. The bearing is subject to relatively light working stresses since elastic ring support is provided between the outer race and the tool to absorb the shock. Rotary water seals and associated wipers are provided on opposite sides of the channel.

OBJECTS OF THE INVENTION

Thus, one object of the present invention is to provide a bearing assembly for a rotary drilling tool where water is provided to lubricate the bearing, and then to cool the tool and to suppress the mining dust.

Another object of the present invention is to provide a bearing assembly utilizing water lubrication and cooling from a single stream of water and obviating the difficulties of prior systems outlined above.

Another object of the present invention is to provide an integral bearing system to protect the seals and optional wipers of a rotary water joint from the forces of the drilling tool.

Still another object of the present invention is to provide a bearing assembly where the lubrication and cooling functions are combined and at least one of the races is provided with an elastic ring support to minimize the bearing stressess.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

DESCRIPTION OF THE PREFERRED EMBODIMENT

Figure 1:
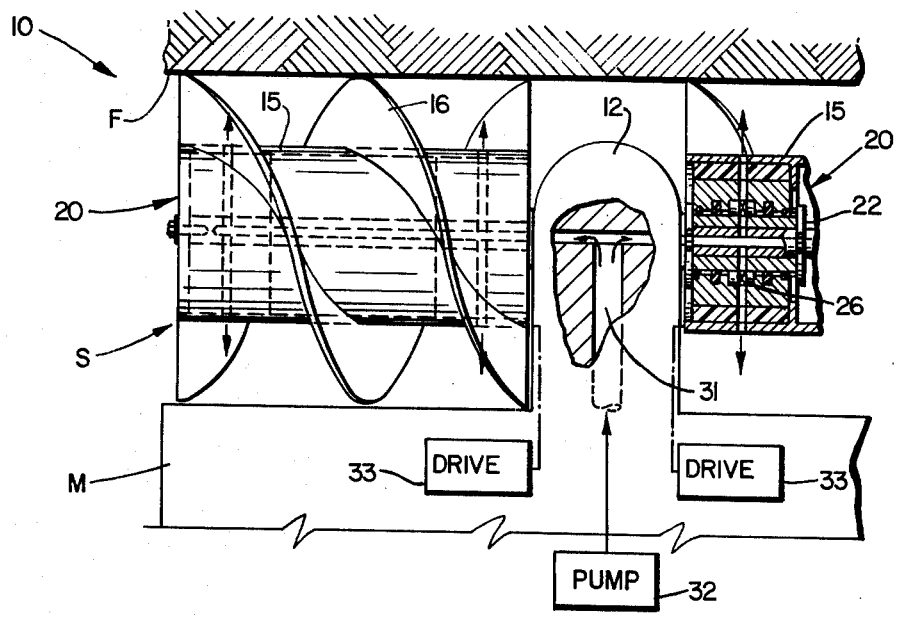
FIG. 1 is a partial cross-sectional view of a rotary drilling tool utilizing a bearing assembly of the present invention.

With reference now to FIG. 1 of the drawing, there is shown a rotary drilling tool or head 10 mounted on the front of a continuous mining machine M. The drilling tool 10 is operating against a wall or rock face F.

As shown in this preferred embodiment, the tool 10 comprises a plurality of tool sections S (only one and a portion of another shown in FIG. 1). The sections S are mounted on shaft segments 11 that extend horizontally along the front of the machine M. The shafts are supported by a forwardly extending suppport arm or strut 12.

Each tool section S may include a tubular body 15 upon which is suppported a helical cutting element 16 with conventional cutter teeth (not shown). The cutting element 16 operates against the rock face F to remove the mineral, such as coal. The tool section S may be either the interior-type cutter shown or alternatively, may be an exterior-type with distinct cutter bits. The bits or cutting elements may include integral orifices for release of the water spray immediatley adjacent the working face F for more efficient dust suppression and tool cooling.

Figure 2:
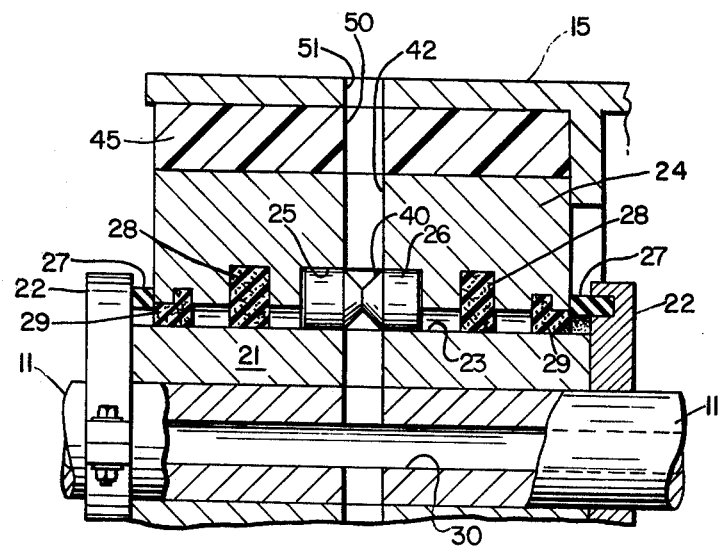
FIG. 2 is an enlarged cross-sectional view taken through the bearing assembly of FIG. 1.

Each of the segments S are rotatably supported at least by a bearing assembly 20, constructed in accordance with the principles of the present invention. The bearing assembly 20 is, in addition, a rotary liquid (water) joint that allows transfer of water from the machine M to the tool face F, as will be seen later in detail. As can best be seen in FIG. 2, the shaft 11 supports an inner race 21 that is held in position by locking collars 22 on both sides. The inner race has an upper bearing surface 23. An outer rotary bearing race 24 has a channel 25 formed adjacent the center thereof. The outer race 24 rotates freely supported on rollers 26 within the channel 25. Annular bumpers 27 on the positioning collars 22 limit sidewise motion of the outer race. Water seals 28 and associated dust excluding wipers 29 are carried on the inside surface of the outer race 24. Additional bearings on the shaft segments 11 (not shown) may be positioned at desired points between the bearings 20.

The shaft segments 11 are provided with an internal water passageway 30 to feed lubricating water to the annular cavity 25. Of course, if desired, the passageway 30 may be in a separate shoulder supported directly from the strut 12. The water is provided through the connecting passageway 31 in the support struts 12. A pump and reservoir 32 is provided in the machine M. A drive 33, also forming a part of the machine M serves to rotate the tool segments S, as is well-known in the art.

It can now be recognized that the need for a separate bearing system and oil lubricating circuit, as an added feature within the rotary water sealing system and to assist in rotary support of the tool, is not required with my invention. The rollers 26 are supported in an integral fashion within the annular cavity 25 and the water flowing through the cavity serves first as lubrication and coolant for the bearing. As will be seen below, the water is next delivered to the tool to perform its additional function, that is, cooling the drilling tool and suppressing the mining dust.

In order to maintain a proper flow of water through the cavity 25, a V-shaped cut-out or notch 40 is formed annularly around the middle of the rollers 26. The presurized lubricating water fills the notch 40 to provide rings of lubricant adjacent the inner and outer races 21, 24. The water moves axially from the center rings around the roller confining cage (not shown) and along the full bearing surface of the rollers 26. The water-lubricant thus filling the void of the cavity 25 between adjacent rollers 26 is positively pumped or circulated for full lubricating action of the rollers. One of more transfer passageways 42 serves to drain the lubricant from the cavity 25.

The body 15 of the individual tool segments S are supported on the outer race 24 by an elastic ring 45. As the helical cutting member 16 engages the rock face F, the elastic ring support 45 will absorb the major portion of stress that is tended to be transferred back to the bearing members 26. For this reason, the bearing members 26 are relatively lightly stressed making the water lubricant more than adequate to accomplish the purpose desired.

Interconnecting passages 50 extend through the ring support 45 and orifices 51 are provided in the body 15 in alignment therewith. The liquid thus drained through passageways 42 flows through the passages 50 and out the orifices 51 into engagement with the rock face F and the helical tool member 16. The water thus used to lubricate and cool the bearing members 26 also serves to water down the rock face F allaying the dust and cooling the tool face of the tool element 16.

From the foregoing, it will be realized that a lower cost and highly efficient system has been provided for a combined bearing assembly and rotary water joint for mining machines with a rotary drilling tool. The water flow through the joint lubricates the bearing and serves to cool the tool face. Only a single liquid supply system is required and only a minimum number of water seals 28 and wipers 29 are required to seal that system. The seals 28 and wipers 29 are protected since the rollers 26 maintain accurate concentric alignment of the components. The channel for flow of the cooling water is used to house the rollers 26, and thus I have formed an integral bearing within the water transfer system itself.

The rollers 26 have an annular V-shape cut-out of approximately fifteen percent of the cross-sectional area of the roller. This helps assure an adequate flow of lubrication and cooling liquid through the system. Elastic ring support 45 absorbs the major shock and stress from the working tool and thus provides for reduced stress on the bearing members or rollers 26. The pump and reservoir 32 provides water under sufficient pressure to assure that any foreign material, such as rock particles, is excluded from the bearing assembly.

In this disclosure, there is shown and described only the preferred embodiment of the invention, but, as aforementioned, it is to be understood that the invention is capable of use in various other combinations and environment and is capable of changes or modifications within the scope of the inventive concept as expressed herein.

What is claimed is:

1. A water lubricated bearing assembly and rotary water joint for a rotary drilling tool comprising: a shaft, an inner and an outer race located concentrically about said shaft and having respective annular bearing surfaces, annular channel means formed between said races to confine a flow of lubricating water in a single stream, at least one bearing member confined in said channel means, a water passageway formed within said shaft and communicating with said channel members, means to supply a pressurized flow of water through said passageway and said channel means sufficient to lubricate said bearing member, and to establish a flow of water to said channel means via said passageway, and transfer means in communication with said channel means to drain the water radially outwardly from said bearing assembly and feed the same to the drilling face of the tool, whereby lubrication, tool cooling function and transfer of water to the drilling face may be combined from a single stream of water.

2. The bearing assembly of claim 1 wherein said bearing member includes at least one roller.

3. The bearing assembly of claim 2 wherein said channel means is formed in part at least by an annular cut-out on said roller.

4. The bearing assembly of claim 3 wherein said cut-out is a notch.

5. The bearing assembly of claim 4 wherein the cross-sectional area of said notch is approximately 15% of the cross-sectional area of said roller to assure an adequate flow for lubrication and for cooling said tool.

6. The bearing assembly of claim 1 wherein said supply means maintains sufficient pressure to maintain positive stream flow away from said bearing member, whereby foreign matter is isolated from said bearing member.

7. The bearing assembly of claim 1 wherein is further provided an elastic ring support between one of said races and said tool to absorb drilling stress from the tool, whereby said member is relatively lightly stressed.

8. The bearing assembly of claim 1 wherein is further provided rotary water seals adjacent the sides of said channel and associated wipers positioned outside said seals.

9. The bearing assembly of claim 1, wherein said passageway is formed on an axis of rotation of said shaft.

10. The bearing assembly of claim 9, wherein said channel means includes a plurality of channels longitudinally spaced apart from each other and connected together by said water passageway.

* * * * *